United States Patent
Nomura

(10) Patent No.: US 7,698,134 B2
(45) Date of Patent: Apr. 13, 2010

(54) DEVICE IN WHICH SELECTION IS ACTIVATED BY VOICE AND METHOD IN WHICH SELECTION IS ACTIVATED BY VOICE

(75) Inventor: Kazuya Nomura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 691 days.

(21) Appl. No.: 11/570,470

(22) PCT Filed: Dec. 20, 2005

(86) PCT No.: PCT/JP2005/023336

§ 371 (c)(1),
(2), (4) Date: Dec. 12, 2006

(87) PCT Pub. No.: WO2006/068123

PCT Pub. Date: Jun. 29, 2006

(65) Prior Publication Data

US 2007/0219805 A1    Sep. 20, 2007

(30) Foreign Application Priority Data

Dec. 21, 2004  (JP) .............................. 2004-368807
Dec. 1, 2005   (JP) .............................. 2005-347641

(51) Int. Cl.
*G10L 15/22* (2006.01)
*G06Q 30/00* (2006.01)

(52) U.S. Cl. .................... 704/231; 704/275; 705/27
(58) Field of Classification Search ................. 704/233, 704/270, 275, 231; 379/88.01, 88.03; 705/26, 705/27
See application file for complete search history.

(56) References Cited

U.S. PATENT DOCUMENTS 5,918,213 A * 6/1999 Bernard et al. ................. 705/26
6,397,188 B1  5/2002 Iwasawa (Continued)

FOREIGN PATENT DOCUMENTS

EP    0 935 123 A2    8/1999

(Continued)

OTHER PUBLICATIONS

Supplementary European Search Report for EP 05 82 0332, dated Jan. 23, 2008.

(Continued)

*Primary Examiner*—Martin Lerner
(74) *Attorney, Agent, or Firm*—RatnerPrestia

(57) ABSTRACT

A selecting device according to voice includes output unit for outputting guide voice for guiding a selection item, voice recognition unit for recognizing a selection instruction for selecting the selection item that is issued during the output of the guide voice by output unit or within a certain time after the completion of the output, and interaction-control and result-selection unit for selecting the selection item instructed to be selected when voice recognition unit recognizes the selection instruction. When a voice for selecting a selection item is raised during the output of the guide voice by output unit or within the certain time after the completion of the output, voice recognition unit can select the selection item, and the selection item can be selected even during the output of the guide voice.

4 Claims, 12 Drawing Sheets

U.S. PATENT DOCUMENTS

| | | |
|---|---|---|
| 6,555,738 B2 * | 4/2003 | Hughes et al. ............... 84/609 |
| 6,693,236 B1 * | 2/2004 | Gould et al. ............. 84/477 R |
| 6,941,268 B2 * | 9/2005 | Porter et al. ............... 704/270 |
| 7,043,447 B2 * | 5/2006 | Hughes et al. ............... 705/26 |
| 7,173,177 B1 * | 2/2007 | Gould et al. ................ 84/615 |
| 7,174,312 B2 * | 2/2007 | Harper et al. ................ 705/35 |
| 7,209,892 B1 * | 4/2007 | Galuten et al. ............... 705/26 |
| 7,509,270 B1 * | 3/2009 | Hendricks et al. ............ 705/26 |
| 7,526,450 B2 * | 4/2009 | Hughes et al. ............... 705/51 |
| 7,562,032 B2 * | 7/2009 | Abbosh et al. ............... 705/26 |
| 2002/0141547 A1 * | 10/2002 | Odinak et al. ........... 379/88.01 |
| 2003/0125945 A1 * | 7/2003 | Doyle ........................ 704/246 |
| 2003/0158732 A1 * | 8/2003 | Pi et al. ..................... 704/251 |
| 2005/0102184 A1 * | 5/2005 | Koyata ........................ 705/16 |
| 2006/0020471 A1 * | 1/2006 | Ju et al. ..................... 704/275 |
| 2006/0080741 A1 * | 4/2006 | Nair ............................ 726/26 |

FOREIGN PATENT DOCUMENTS

| | | |
|---|---|---|
| JP | 63-240598 | 10/1988 |
| JP | 03-293400 | 12/1991 |
| JP | 04-301697 | 10/1992 |
| JP | 06-149534 | 5/1994 |
| JP | 2000-338992 | 12/2000 |
| JP | 2001-013978 | 1/2001 |
| JP | 2003-177788 | 6/2003 |
| JP | 2003-208196 | 7/2003 |
| JP | 2004-213016 | 7/2004 |
| WO | WO 01/71480 A2 | 9/2001 |

OTHER PUBLICATIONS

Plamen J. Prodanov, et al., "Voice Enabled Interface for Interactive Tour-Guide Robots", Proceedings of the 2002 IEEE/RSJ International Conference on Intelligent Robots and Systems EPFL, Sep. 30, 2002, vol. 1 of 3, pp. 1332-1337, Lausanne, Swizerland.

International Search Report for application No. PCT/JP2005/023336 dated Jan. 31, 2006.

* cited by examiner

DEVICE IN WHICH SELECTION IS ACTIVATED BY VOICE AND METHOD IN WHICH SELECTION IS ACTIVATED BY VOICE

TECHNICAL FIELD

The present invention relates to a selecting device according to voice that selects an item presented by a system according to the voice, and a selecting method thereof.

BACKGROUND ART

As a selecting device according to voice, conventionally, a device that identifies a controlled object according to the voice, then sequentially outputs selection items of the controlled contents, and makes a user select a selection item is known (for example, Japanese Patent Unexamined Publication No. H03-293400).

The device disclosed by Japanese Patent Unexamined Publication No. H03-293400 is operated as follows. When a user controls a switch to put the voice control system into an operable state, and says the name of an apparatus to be controlled in this state, the device recognizes the name and sequentially sounds the control items of the apparatus having this name by voice synthesis. By saying "YES" when the device sounds the appropriate control item, the user can thus make the device execute a control matching with the item.

The following device is also disclosed (for example, Japanese Patent Unexamined Publication No. H06-149534). When a user converts a screen of a personal computer into a large screen using a projector, and says one of the items displayed on the large screen based on the screen contents, the device highlights the item. When the user operates the execution button, the device displays the detail contents of the item. The user can monitor and control the detail contents of the item.

However, Japanese Patent Unexamined Publication No. H03-293400 or Japanese Patent Unexamined Publication No. H06-149534 does not specifically disclose a method of receiving the voice of the user that coincides a selection item presented by the system. In a usual voice recognition method, therefore, the voice recognition is difficult during output of the selection items with synthetic voice, and the output method of the selection items by the system is limited to voice. For example, selection of music, images, or the like cannot be directly performed according to voice.

SUMMARY OF THE INVENTION

The present invention addresses the conventional problems. The present invention provides a selecting device and selecting method according to voice that can recognize voice even while selection items are being output with synthetic voice or even when music, images, and the like are used as selection items.

A selecting device according to voice of the present invention includes the following elements:
- an output unit for outputting guide voice for guiding a selection item;
- a voice recognition unit for recognizing a selection instruction for selecting the selection item that is issued during the output of the guide voice by the output unit or within a certain time after the output; and
- an interaction-control and result-selection unit for selecting the selection item instructed to be selected when the voice recognition unit recognizes the selection instruction.

Thanks to this configuration, by raising the voice for selecting a selection item during the output of the guide voice by the output unit or within the certain time after the output, a user can select the selection item with the voice recognition unit. In other words, the selection item can be selected even during the output of the guide voice.

In the selecting device according to voice of the present invention, when the selection instruction is not issued during the output of the guide voice by the output unit or within the certain time after the output, the interaction control and result selection unit controls the output unit to output the guide voice for guiding the next selection item.

Thanks to this configuration, when the voice for selecting a selection item is not raised, the guide voice for guiding the next selection item is output sequentially after a certain time. Therefore, the user can arbitrarily issue a selection instruction of a desired selection item, and can select the desired selection item.

In the selecting device according to voice of the present invention, the voice recognition unit has a voice canceling unit for subtracting the guide voice output by the output unit from the voice fed into the voice recognition unit.

Thanks to this configuration, the guide voice output by the output unit is fed into the voice recognition unit, the accident that the voice recognition unit fails to recognize the selection instruction can be prevented as much as possible, and the selection instruction can be accurately recognized even during the output of the guide voice.

The selecting device according to voice of the present invention further has a music playing unit for playing a part or the whole of the music corresponding to the guide voice. The voice recognition unit recognizes the selection instruction issued during music play by the music playing unit or within a certain time after the music play.

Thanks to this configuration, only by raising the voice for the selection instruction of a selection item during the play of the music corresponding to the guide voice or within the certain time after the music play, the music can be selected and heard.

The selecting device according to voice of the present invention further has an image generating unit for generating the image corresponding to the guide voice. The voice recognition unit recognizes the selection instruction issued during image generating by the image generating unit or within a certain time after the image generating.

Thanks to this configuration, only by raising the voice for the selection instruction of a selection item during the generating of the image corresponding to the guide voice or within the certain time after the image generating, the image can be selected. For example, when the image is a still image, the still image can be kept on being watched as it is. When the image is a moving image, the moving image can be continuously watched.

The selecting device according to voice of the present invention further has an input-waiting-time-length setting unit for setting a certain time during the output of guide voice by the output unit or after the completion of the output. The voice recognition unit recognizes the selection instruction for selecting a selection item that is issued within the certain time set by the input-waiting-time-length setting unit.

Thanks to this configuration, by raising the voice for selecting a selection item during the output of the guide voice by the output unit or within the input-waiting-time-length of the certain time after the completion of the output, the selection item can be selected with the voice recognition unit. In other words, the selection item can be further certainly selected even during the output of the guide voice.

A selecting method according to voice of the present invention has the following steps:

an output step of outputting guide voice for guiding a selection item;

a voice recognition step of recognizing a selection instruction for selecting the selection item that is issued during the output of the guide voice in the output step or within a certain time after the completion of the output; and an interaction-control and result-selection step of selecting the selection item instructed to be selected when the selection instruction is recognized in the voice recognition step.

Thanks to this configuration, by raising voice for selecting a selection item during the output of the guide voice in the output step or within the certain time after the completion of the output, the selection item can be selected in the voice recognition step. In other words, the selection item can be selected even during the output of the guide voice.

A selecting device according to voice of the present invention includes the following elements:

an output unit for outputting guide voice for guiding a selection item;

a voice recognition unit for recognizing a selection instruction for selecting the selection item that is issued during the output of the guide voice by the output unit or within a certain time after the completion of the output; and an interaction control and result selection unit for selecting the selection item instructed to be selected when the voice recognition unit recognizes the selection instruction.

By raising voice for selecting a selection item during the output of the guide voice by the output unit or within the certain time after the completion of the output, the selection item can selected. In other words, the selection item can be selected even during the output of the guide voice.

A selecting method according to voice of the present invention has the following steps:

an output step of outputting guide voice for guiding a selection item;

a voice recognition step of recognizing a selection instruction for selecting the selection item that is issued during the output of the guide voice in the output step or within a certain time after the completion of the output; and an interaction control and result selection step of selecting the selection item instructed to be selected when the selection instruction is recognized in the voice recognition step.

By raising voice for selecting a selection item during the output of the guide voice in the output step or within the certain time after the completion of the output, the selection item can be selected. In other words, the selection item can be selected even during the output of the guide voice.

A selecting device according to voice of the present invention includes the following elements:

an output unit for outputting guide voice for guiding a selection item;

an input-waiting-time-length setting unit for setting a certain time during the output of guide voice by the output unit or after the completion of the output;

a voice recognition unit for recognizing a selection instruction for selecting the selection item that is issued within the certain time set by the input-waiting-time-length setting unit; and an interaction control and result selection unit for selecting the selection item instructed to be selected when the voice recognition unit recognizes the selection instruction.

By raising voice for selecting a selection item during the output of the guide voice by the output unit or within the input-waiting-time-length of the certain time after the completion of the output, the selection item can be selected with the voice recognition unit. In other words, the selection item can be further certainly selected even during the output of the guide voice.

Figure 1:
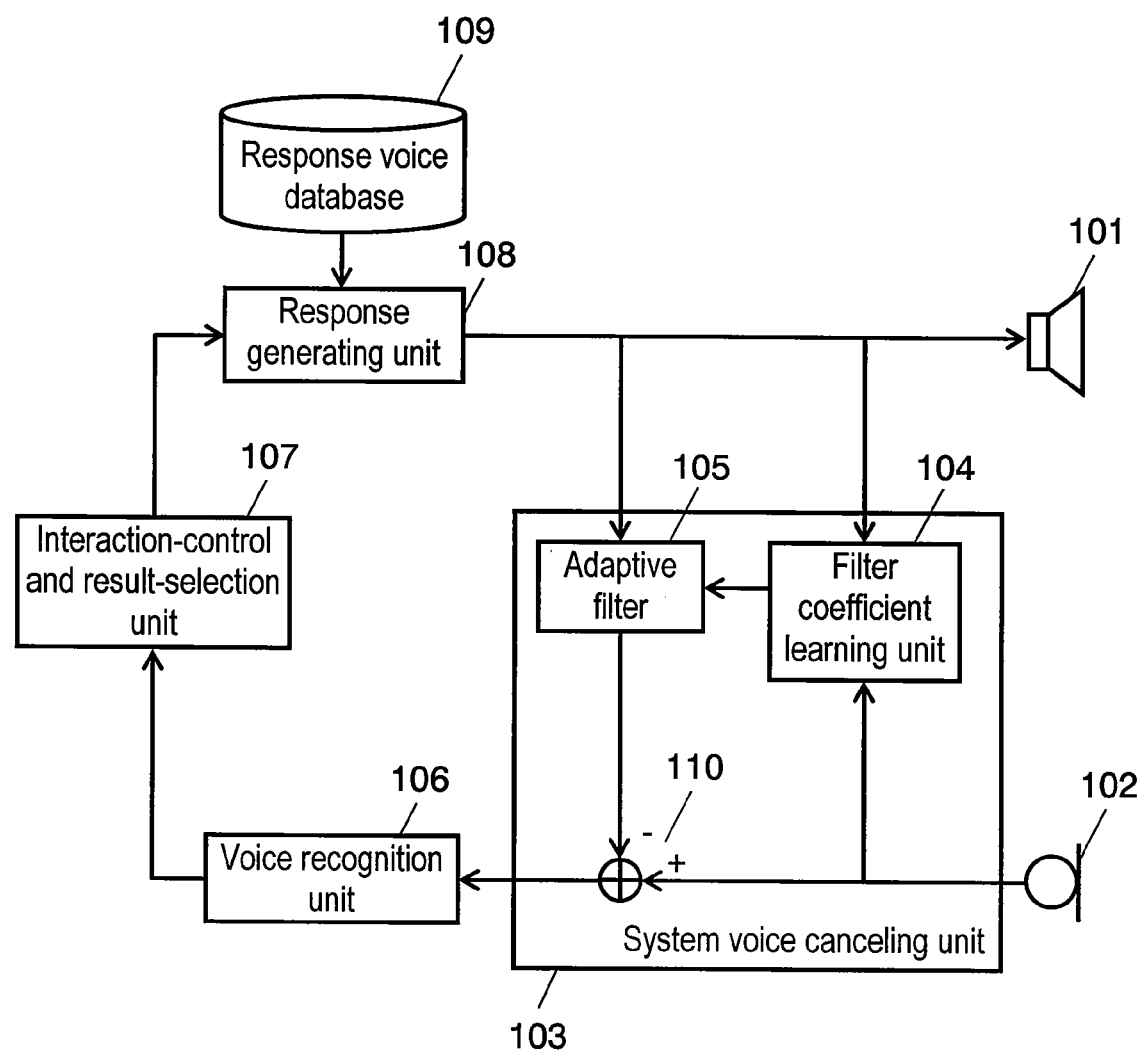
FIG. 1 is a schematic block diagram of a selecting device according to voice in accordance with exemplary embodiment 1 of the present invention.

REFERENCE MARKS IN THE DRAWINGS 101 speaker
102 microphone
103 system voice canceling unit
104 filter coefficient learning unit
105 adaptive filter
106 voice recognition unit
107, 1007 interaction-control and result-selection units
108, 1008 response generating units
109 response voice database
110 subtracter
411 music playing unit
412 music database
413 mixer 700 display
711 image generating unit
712 image and moving image database
1011 input-waiting-time-length setting unit

DETAILED DESCRIPTION OF PREFERRED EMBODIMENTS

Exemplary embodiments of the present invention will be hereinafter described with reference to the drawings.

Exemplary Embodiment 1

FIG. 1 is a schematic block diagram of a selecting device according to voice in accordance with exemplary embodiment 1 of the present invention.

In FIG. 1, the selecting device according to voice in accordance with exemplary embodiment 1 has the following elements:

speaker (voice output unit) 101 as an output unit for outputting system-side voice such as voice for guide or response voice to a user;

microphone 102 for converting voice raised by the user to a voice signal;

system voice canceling unit 103 as a voice canceling unit for canceling an output equivalent signal equivalent to the guide voice output from speaker 101 from the voice signal supplied from microphone 102;

voice recognition unit 106 for recognizing speech contents of the user voice, based on the voice signal acquired by canceling an overlapping signal part from the voice signal supplied from microphone 102 with system voice canceling unit 103;

interaction-control and result-selection unit 107 for selecting a corresponding response voice based on the contents of the user voice acquired by voice recognition unit 106, controlling the interaction with the user, and simultaneously selecting a result;

response voice database 109 for storing response voice data; and response generating unit 108 for generating a response voice signal to be supplied to speaker 101 or system voice canceling unit 103, using the data in response voice database 109, based on the output of interaction control and result selection unit 107.

System voice canceling unit 103 has the following elements:

filter coefficient learning unit 104 for learning and optimally adjusting the filter coefficient (impulse response) obtained using an LMS (Least Mean Square)/Newton algorism, for example, based on the voice signal supplied from microphone 102 and the response voice signal supplied from response generating unit 108;

adaptive filter 105 for correcting and outputting the response voice signal based on the impulse response supplied from filter coefficient learning unit 104; and subtracter 110 for subtracting the output signal supplied from adaptive filter 105 from the voice signal supplied from microphone 102.

Voice recognition unit 106 has the following elements:

an acoustic processing unit for acoustically processing the voice signal acquired by subtracting the equivalent overlapping part of the voice response from the voice signal supplied from microphone 102 with system voice canceling unit 103;

a phoneme identifying unit for selecting and identifying the likeliest phoneme candidate based on a minimum unit of the voice obtained by the acoustic processing unit;

a dictionary database storing words or the like related to the application purpose of the voice interaction system; and a language processing unit that selects a word candidate based on the phoneme obtained by the phoneme identifying unit and the voice data from the dictionary database, and performs language processing for obtaining correct sentence using language information such as a sentence structure, meaning, and context.

The acoustic processing unit converts the voice signal supplied from microphone 102 to a time-series vector called a characteristic amount vector using an LPC Cepstrum (Linear Predictor Coefficient Cepstrum), for example, and estimates the shape (spectrum envelope) of the voice spectrum.

The phoneme identifying unit encodes the voice signal into a phoneme using an acoustic parameter extracted by the acoustic processing unit based on the input voice in an HMM (Hidden Markov Model) method or the like, compares the phoneme with a previously prepared standard phoneme model, and selects the likeliest phoneme candidate.

Interaction control and result selection unit 107 selectively controls the response contents based on the contents of the voice signal recognized by voice recognition unit 106, outputs the response contents to response generating unit 108, and selectively outputs the result.

Response generating unit 108 generates a response voice signal using data supplied from response voice database 109 based on the contents determined by interaction control and result selection unit 107, and outputs the produced response voice signal to speaker 101.

An operation of the selecting device according to voice in accordance with exemplary embodiment 1 of the present invention is described in detail with reference to FIG. 2 and FIG. 3.

Figure 2:
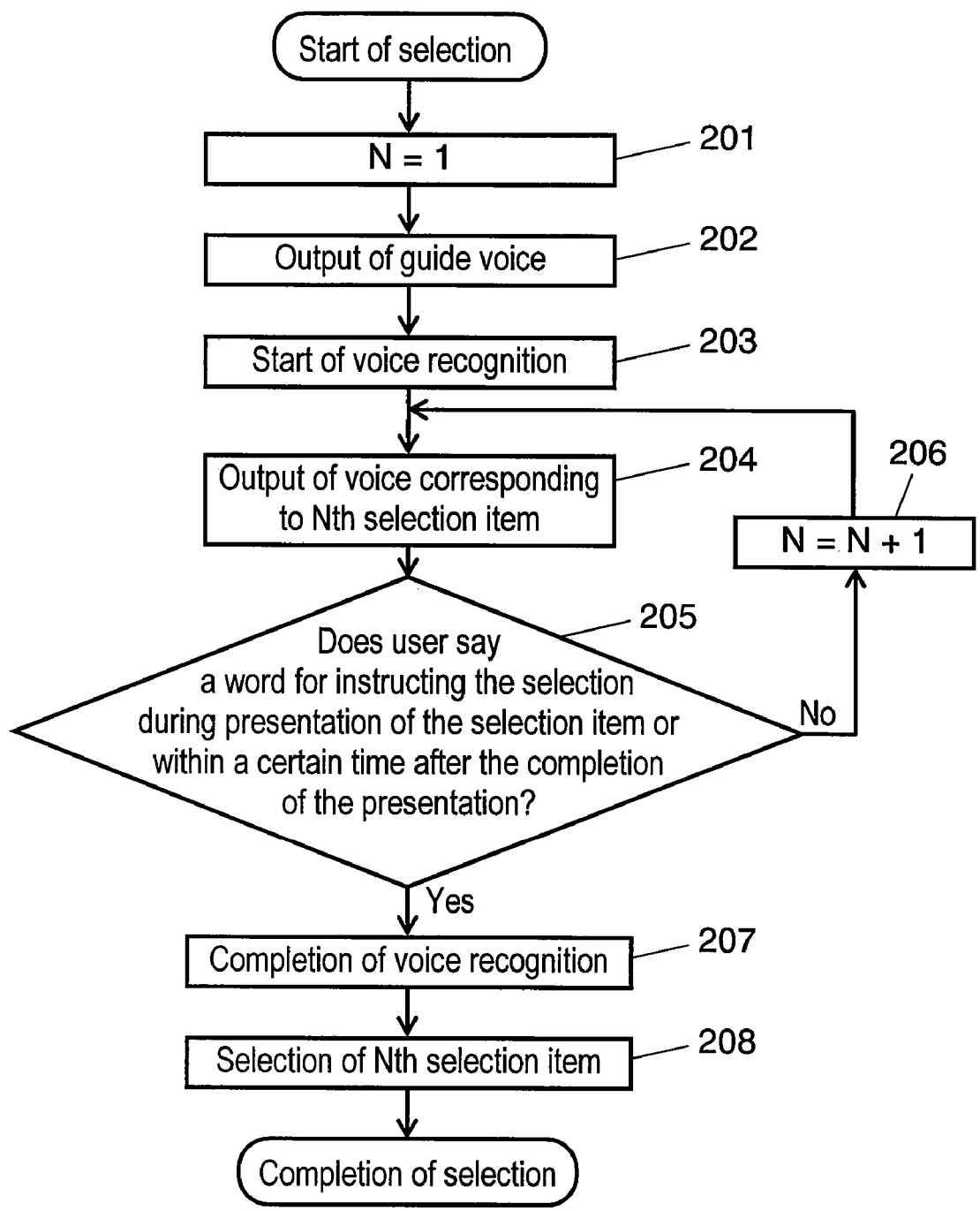
FIG. 2 is a flowchart showing an operation of the selecting device according to voice in accordance with exemplary embodiment 1 of the present invention.
Figure 3:
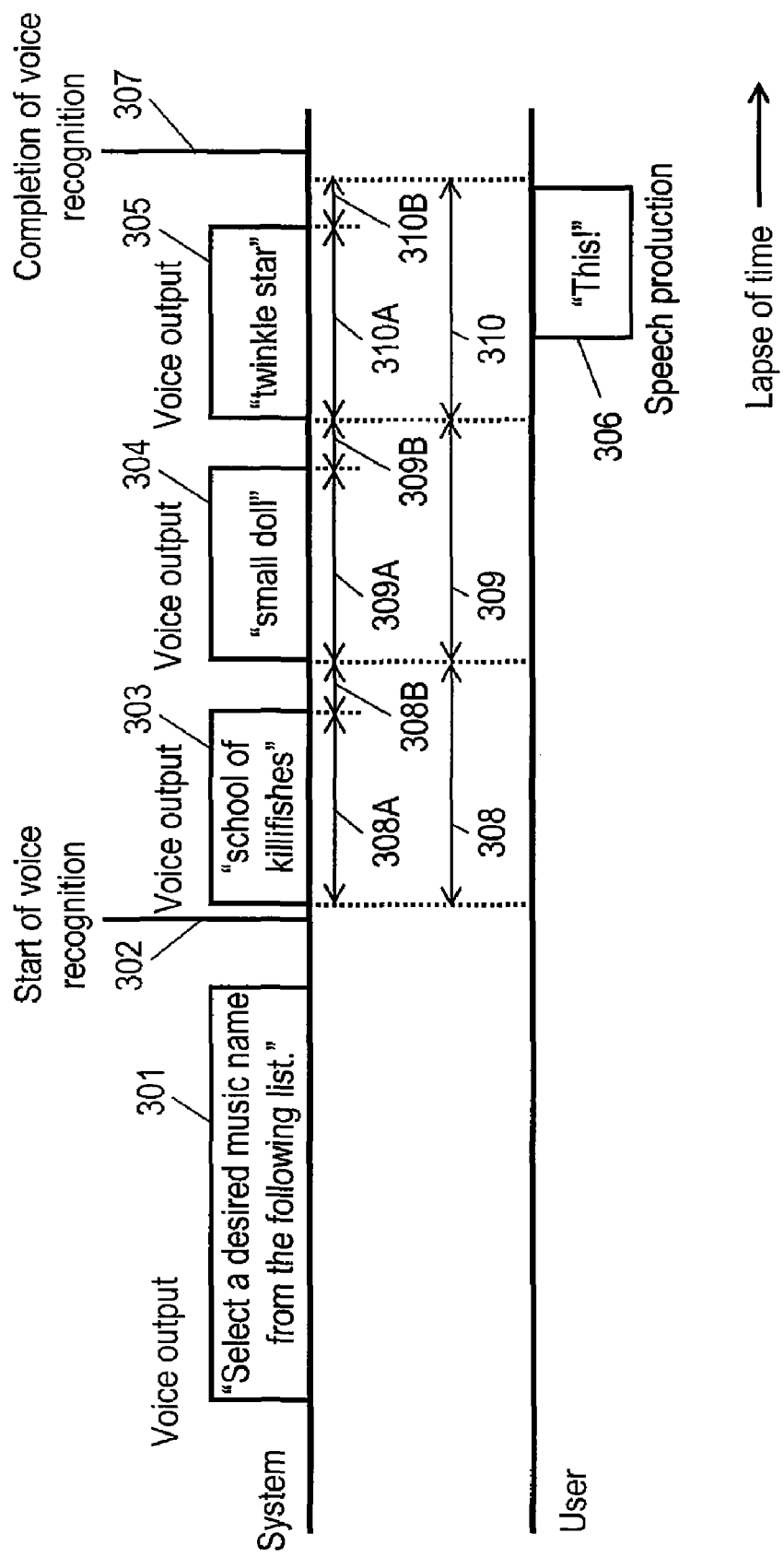
FIG. 3 is a time chart showing the operation of the selecting device according to voice in accordance with exemplary embodiment 1 of the present invention.

FIG. 2 is a flowchart showing the operation of the selecting device according to voice in accordance with exemplary embodiment 1 of the present invention, and FIG. 3 is a time chart showing the operation of the selecting device.

First, a selection starting operation is performed, and counter N of the selection items is set at 1 under control of interaction control and result selection unit 107 (step 201). After the setting of counter N of the selection items at 1, response generating unit 108 supplies guide voice from response voice database 109 to speaker 101 based on an instruction from interaction control and result selection unit 107 (step 202).

As shown in the time chart of the system of FIG. 3, for example, guide voice (301) such as "Select a desired music name from the following list" is supplied to speaker 101.

After the guide voice is supplied to speaker 101, voice recognition is started so that the selection instruction from a user can be recognized (step 203). Thus, voice recognition unit 106 is started as shown in FIG. 3 (302).

After the start of voice recognition unit 106, response generating unit 108 accesses response voice database 109 under control of interaction control and result selection unit 107, and outputs the voice data corresponding to the first selection item (step 204).

In other words, as shown in FIG. 3, guide voice (303) such as "school of killifishes" is supplied to speaker 101. Period 308A when guide voice "school of killifishes" (303) is output and certain time (input-waiting-time-length) 308B after the completion of the output correspond to period 308 when "school of killifishes" as the first selection item can be selected. Therefore, by saying a word for instructing the selection, for example "This!", in period 308, the user can select "school of killifishes".

When the user does not say any word for instructing the selection, for example "This!", in period 308 when "school of killifishes" can be selected, 1 is added to counter N of the selection items to provide the state where the guide voice corresponding to the next selection item is output.

In other words, when the voice corresponding to the selection item is output (step 204), interaction control and result selection unit 107 determines whether or not the user says a word for instructing the selection during presentation of the selection item or within the certain time after the completion of the presentation (step 205).

When the user instructs the selection ("Yes" in step 205), "school of killifishes" is selected, for example. When the user does not instruct the selection ("No" in step 205), 1 is added to counter N of the selection items (step 206) to provide the state where the guide voice corresponding to the next selection item, namely the second selection item, is output (step 204).

Response generating unit 108 accesses response voice database 109, and outputs the second guide voice, for example "small doll" (304), to speaker 101.

In this case, also, period 309A when guide voice "small doll" (304) is output and certain time (input-waiting-time-length) 309B after the completion of the output correspond to period 309 when "small doll" as the second selection item can be selected. By saying a word for instructing the selection, for example "This!", in period 309, the user can select "small doll" as the second selection item.

When the user does not say any word for instructing the selection, for example "This!", during presentation of the selection item or within the certain time after the completion of the presentation, interaction control and result selection unit 107 determines this situation (step 205). After the determination, the path "No" is selected, and 1 is added to counter N of the selection items (step 206) similarly to the previous case to provide the state where the guide voice corresponding to the next selection item, namely the third selection item, is output (step 204).

Response generating unit 108 then accesses response voice database 109, and outputs the third guide voice, for example "twinkle star" (305), to speaker 101.

Period 310A when the third guide voice "twinkle star" (305) is output and certain time (input-waiting-time-length) 310B after the completion of the output correspond to period 310 when "twinkle star" as the third selection item can be selected. By saying a word for instructing the selection, for example "This!", in period 310, the user can select "twinkle star".

In FIG. 3, for instructing the selection of "twinkle star" as the third selection item, the user raises instruction voice (306) such as "This!" for selecting "twinkle star" during the output of the third guide voice "twinkle star" (305) or within the certain time after the output.

When the user raises the instruction voice "This!" (306) during the output of the guide voice "twinkle star" (305), the guide voice "twinkle star" (305) and the instruction voice "This!" (306) are coincidentally fed into microphone 102. However, system voice canceling unit 103 cancels a signal corresponding to the guide voice, namely a signal corresponding to the voice of "twinkle star" (305), from the signal fed into microphone 102, and voice recognition unit 106 can correctly recognize the instruction voice "This!" (306) raised by the user.

In FIG. 2, when the user says a word for instructing the selection, for example "This!", during presentation of the selection item or within the certain time after the completion of the presentation, voice recognition unit 106 recognizes the word, interaction control and result selection unit 107 determines this situation (step 205), and the path "Yes" is selected.

After the path "Yes" is selected, the voice recognition is performed and finished (step 207), and the selection item at this time is selected (step 208). After that, interaction control and result selection unit 107 performs interaction control based on the selected result, for example, "twinkle star".

When the user does not say any word for instructing the selection within a certain time after the presentation of the final selection item (not shown), speaker 101 gives a warning of time out, and the voice recognition is finished to stop the selection.

In exemplary embodiment 1 of the present invention, when a user says a word for instructing the selection during presentation of a selection item by voice from the system or within the input-waiting-time-length of the certain time after the completion of the presentation, the selection item at the stage when the word for instructing the selection is said can be selected.

Exemplary Embodiment 2

Figure 4:
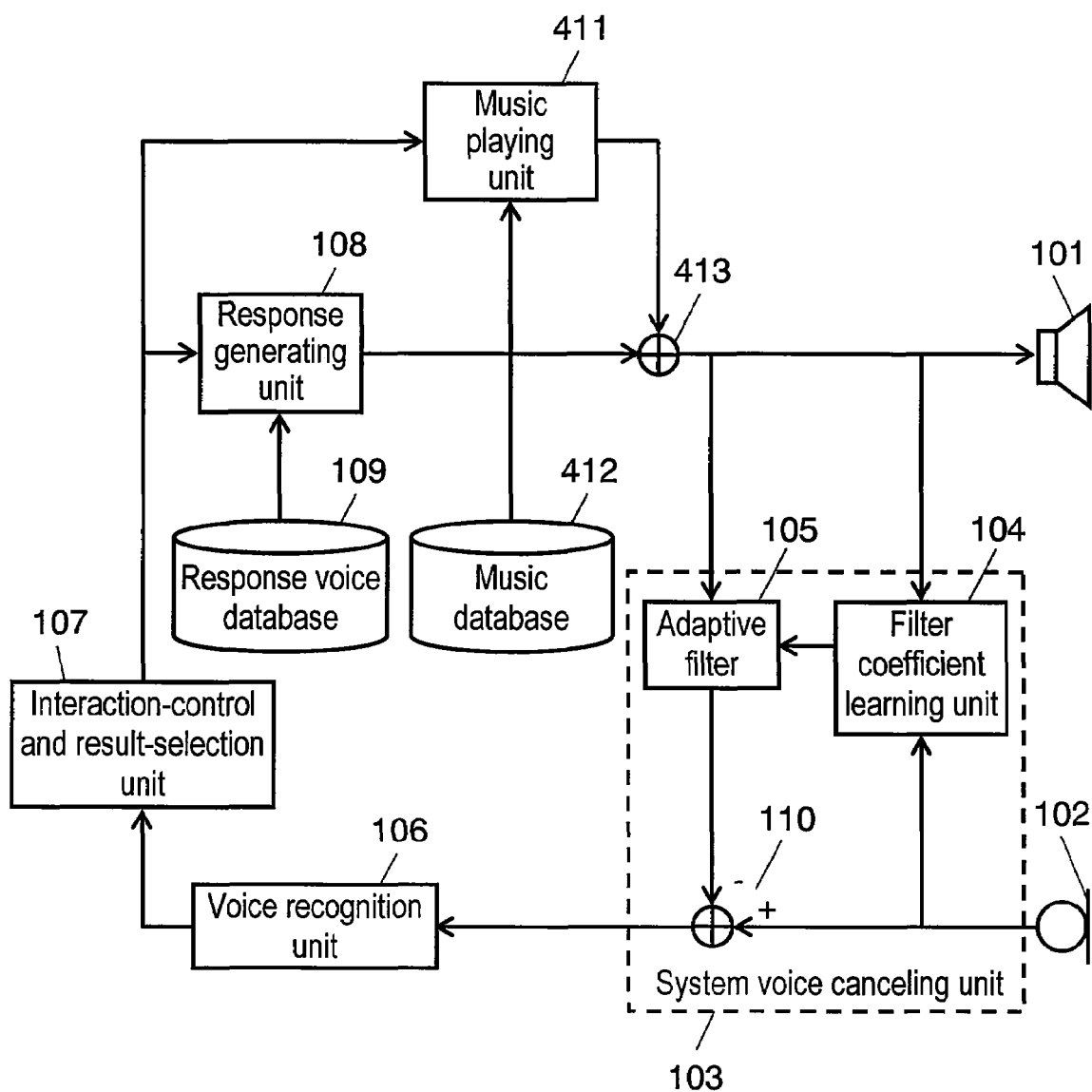
FIG. 4 is a schematic block diagram of a selecting device according to voice in accordance with exemplary embodiment 2 of the present invention.
Figure 5:
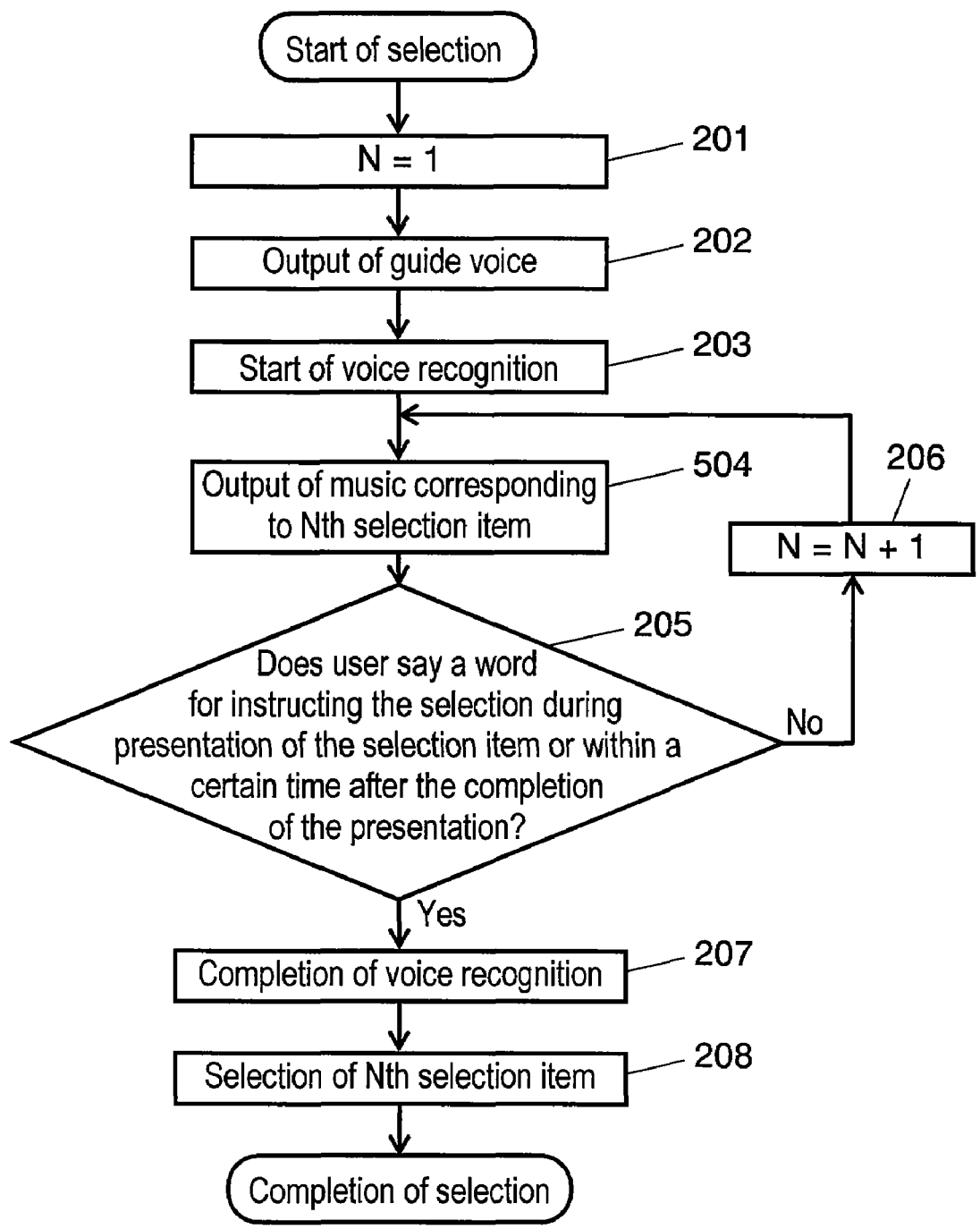
FIG. 5 is a flowchart showing an operation of the selecting device according to voice in accordance with exemplary embodiment 2 of the present invention.
Figure 6:
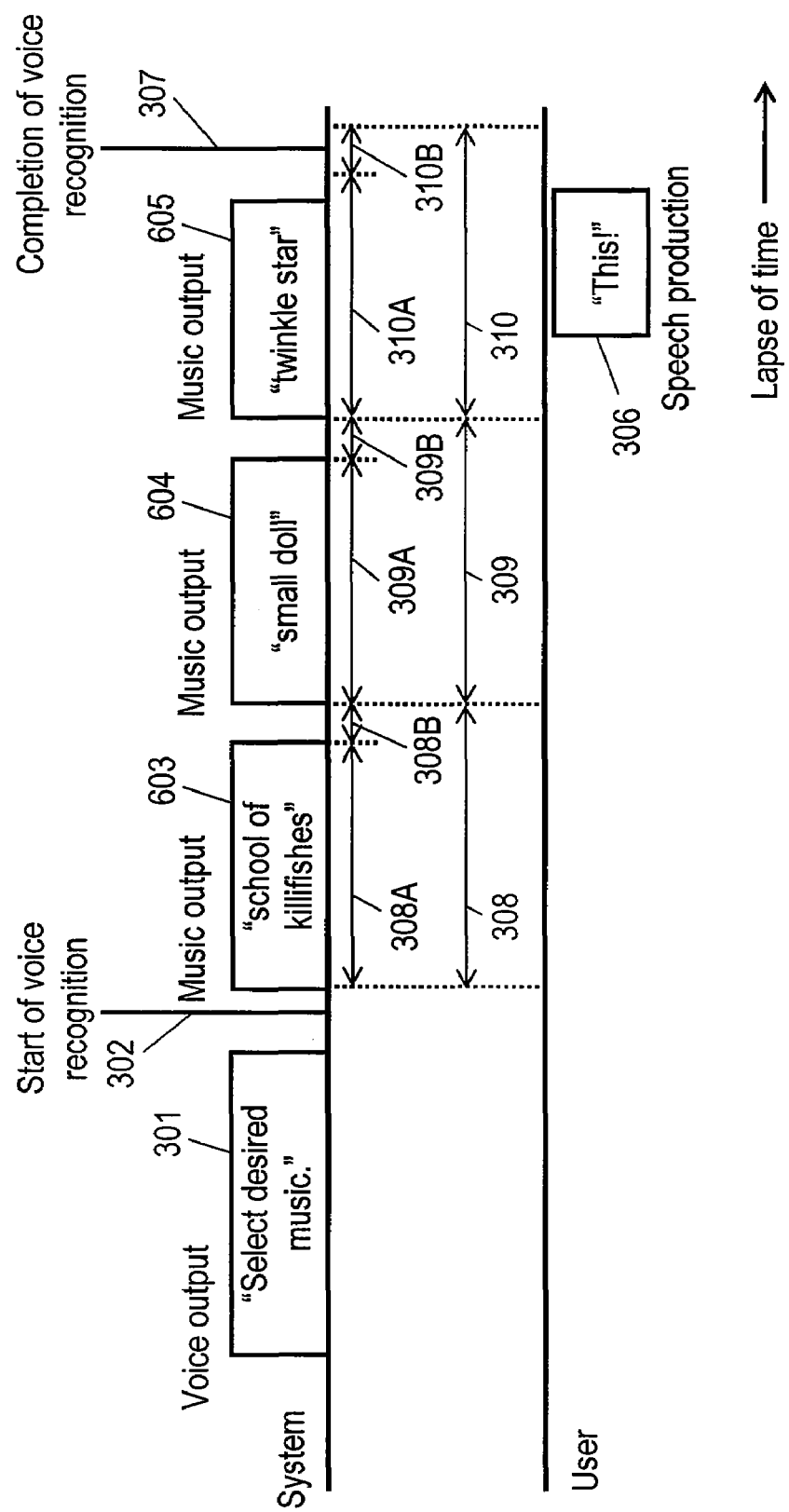
FIG. 6 is a time chart showing the operation of the selecting device according to voice in accordance with exemplary embodiment 2 of the present invention.

FIG. 4 is a schematic block diagram of a selecting device according to voice in accordance with exemplary embodiment 2 of the present invention. FIG. 5 is a flowchart showing an operation of the selecting device. FIG. 6 is a time chart showing the operation of the selecting device.

In FIG. 4 through FIG. 6, elements denoted with the same reference marks as those of embodiment 1 in FIG. 1 through FIG. 3 show the same configurations and contents as those of embodiment 1 in FIG. 1 through FIG. 3, and the detail descriptions of those elements are omitted.

The selecting device of the present exemplary embodiment has music playing unit 411 to be controlled by an instruction from interaction-control and result-selection unit 107, and music database 412 storing a plurality of pieces of music, in addition to the elements of exemplary embodiment 1.

Music playing unit 411 accesses music database 412 in response to the instruction from interaction control and result selection unit 107, and plays the music selected by interaction control and result selection unit 107. The music reproduced by music playing unit 411, together with the output from response generating unit 108, is supplied to speaker 101 through mixer 413.

In FIG. 6, pieces 603 through 605 of guide music to be output correspond to guide voices 303 through 305 in FIG. 3, respectively.

The selecting device of the present embodiment not only outputs the guide voice as a selection item, but also music itself corresponding to the selection item at the same time, as shown in FIG. 5 and FIG. 6. This is more convenient to select music.

Step 504 of outputting music corresponding to the Nth selection item in the present embodiment corresponds to step 204 of outputting guide voice corresponding to the Nth selection item in embodiment 1. In step 504, both of the guide voice corresponding to the Nth selection item and music corresponding to the Nth selection item are output sequentially. In other words, the music name is firstly output and then the music is output, so that the convenience to select music is increased.

For selection, the whole music (whole of one piece of music) is not required to be output, but only the introduction or an essential part of the music may be output, for example. When the music supplied for selection is selected whether the whole music is supplied or only the introduction or the essential part of the music is supplied for selection, music playing unit 411 can continuously output the music, or can temporarily return to the beginning of the music and output the music.

In the present embodiment, when the selecting device presents selection items of music, and a user says a word for instructing the selection during the presentation or within a certain time after the completion of the presentation, the user can easily select the desired music.

Exemplary Embodiment 3

Figure 7:
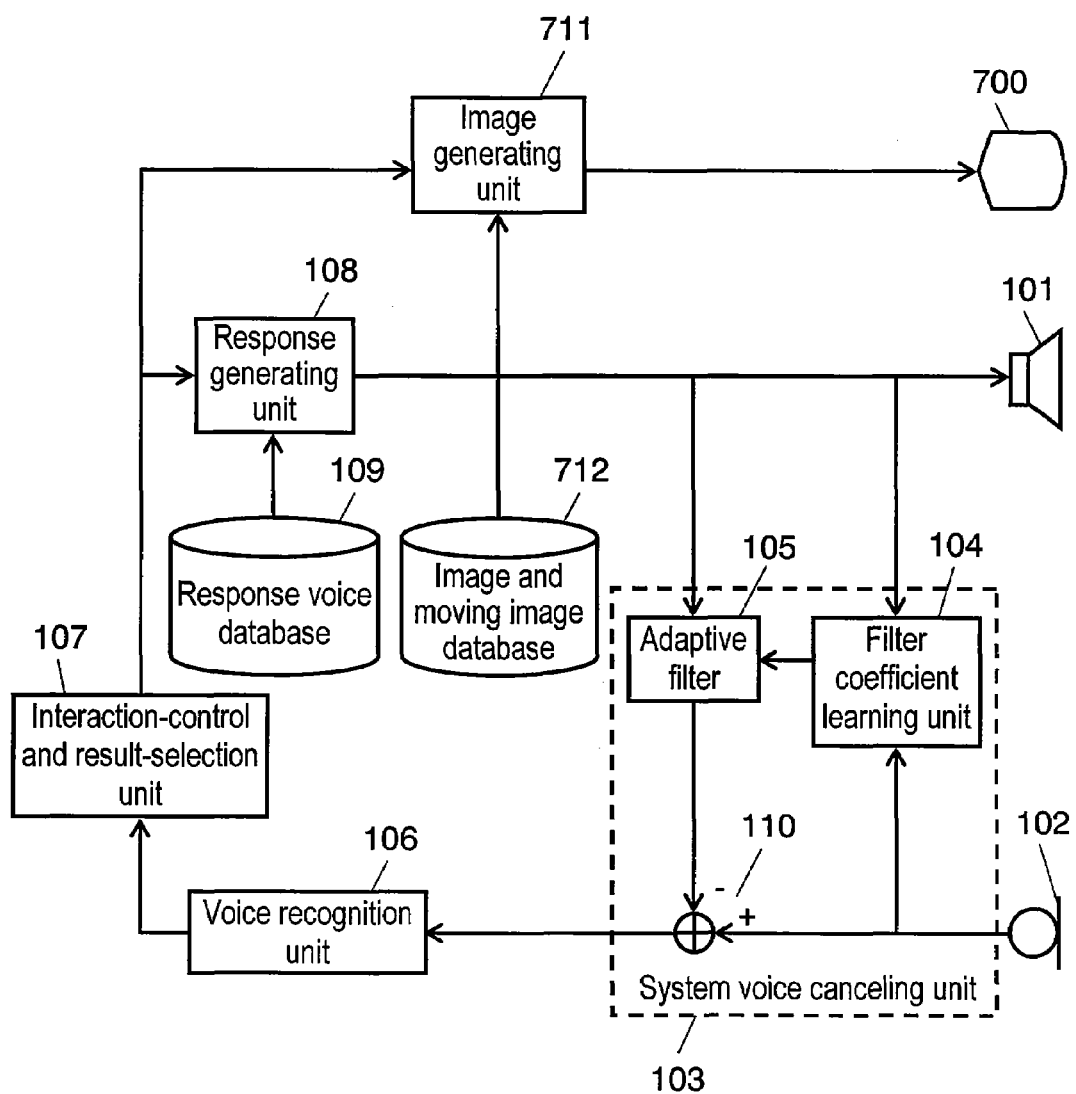
FIG. 7 is a schematic block diagram of a selecting device according to voice in accordance with exemplary embodiment 3 of the present invention.
Figure 8:
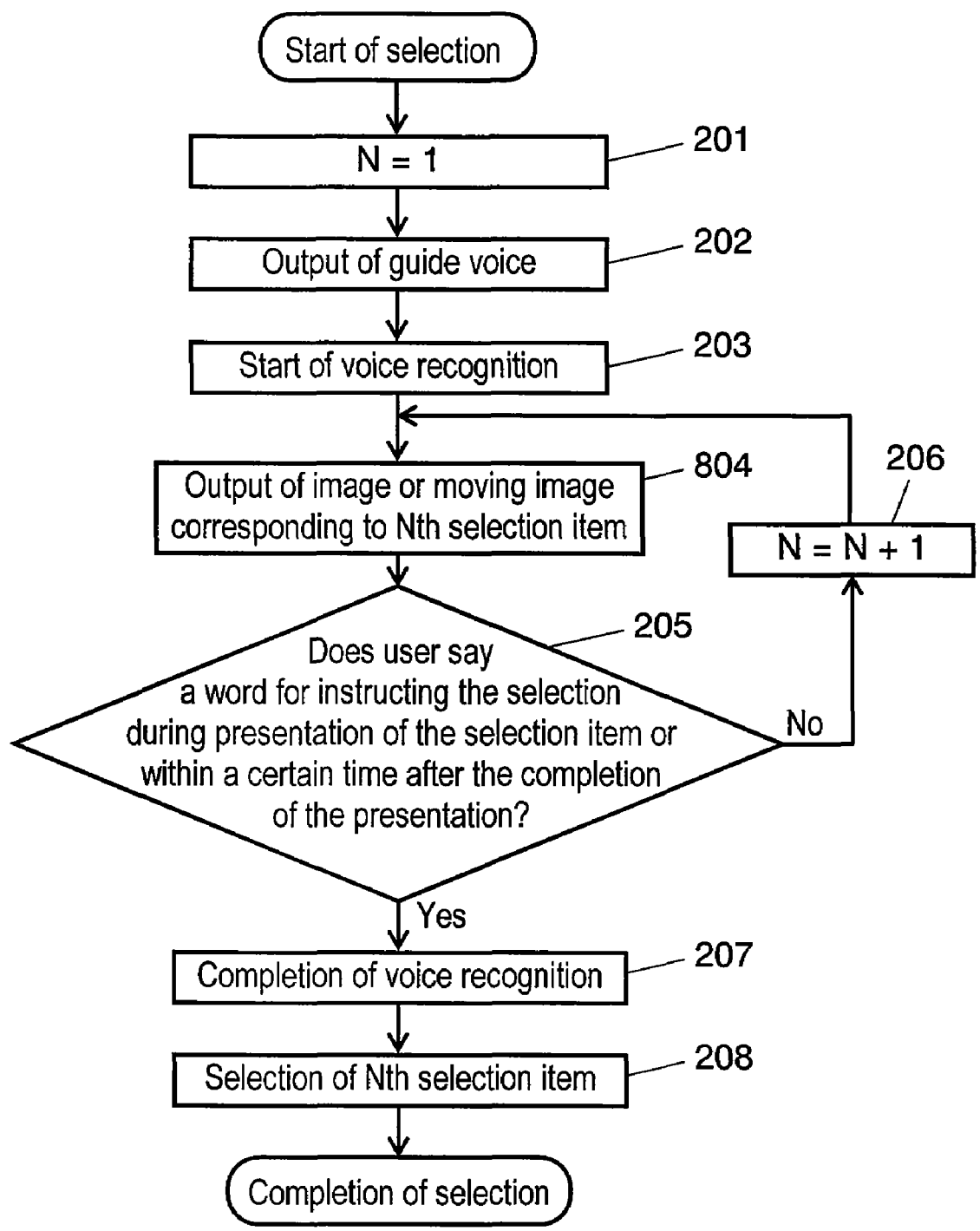
FIG. 8 is a flowchart showing an operation of the selecting device according to voice in accordance with exemplary embodiment 3 of the present invention.
Figure 9:
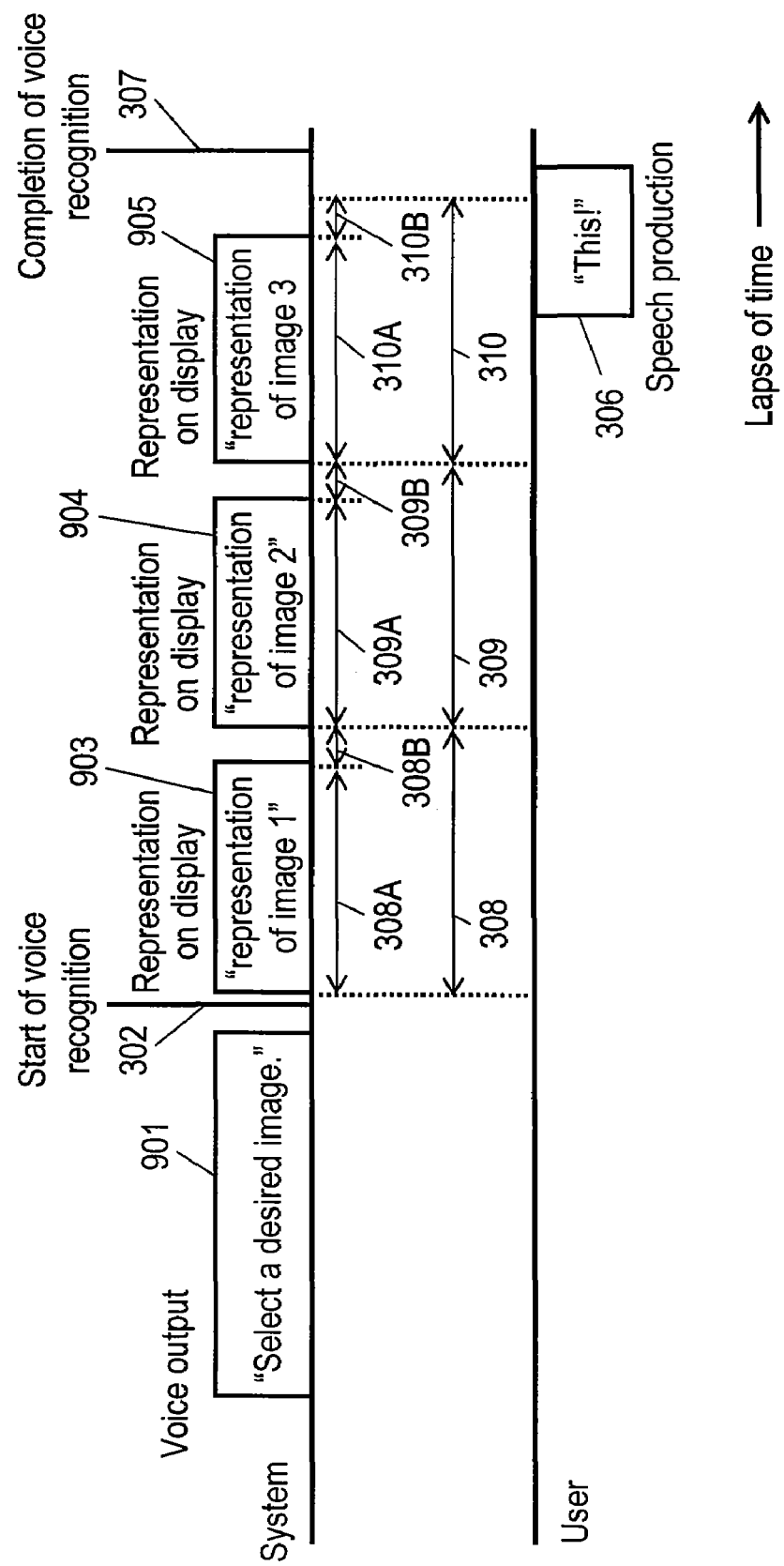
FIG. 9 is a time chart showing the operation of the selecting device according to voice in accordance with exemplary embodiment 3 of the present invention.

FIG. 7 is a schematic block diagram of a selecting device according to voice in accordance with exemplary embodiment 3 of the present invention. FIG. 8 is a flowchart showing an operation of the selecting device. FIG. 9 is a time chart showing the operation of the selecting device.

In FIG. 7 through FIG. 9, elements denoted with the same reference marks as those of embodiment 1 in FIG. 1 through FIG. 3 show the same configurations and contents as those of embodiment 1 in FIG. 1 through FIG. 3, and the detail descriptions of those elements are omitted.

In addition to the elements of exemplary embodiment 1, the selecting device of the present exemplary embodiment has the following elements:

image generating unit 711 to be controlled by an instruction from interaction-control and result-selection unit 107;

image database 712 storing a plurality of images such as still images and moving images; and display 700 for displaying an image generated by image generating unit 711.

Image generating unit 711 accesses image database 712 in response to the instruction from interaction control and result selection unit 107, outputs image data such as a still image or a moving image selected by interaction control and result selection unit 107, and forms an image. The image generated by image generating unit 711 is displayed by display 700.

In FIG. 9, guide voice 901 to be output by a sound and guide images 903 through 905 to be displayed on the display correspond to guide voices 301 and 303 through 305 in FIG. 3, respectively.

The selecting device of the present embodiment not only outputs the guide voice as a selection item, but also displays the image corresponding to the selection item on display 700, as shown in FIG. 8 and FIG. 9. This is more convenient to select the selection item.

Step 804 of outputting the image corresponding to the Nth selection item in the present embodiment corresponds to step 204 of outputting guide voice corresponding to the Nth selection item in embodiment 1. In step 804, both of the guide voice corresponding to the Nth selection item and the image corresponding to the Nth selection item are output sequentially. In other words, the guide voice is output by a sound from speaker 101, and the image is displayed as an image or a moving image on display 700. With reference to these, the selection item can be easily selected.

When the image output for selection is a moving image, the whole of the moving image is not required to be output, but only a beginning part or an essential certain-time part of the image may be output, for example. When the image output for selection is selected whether the whole or only the certain-time part of the image is output for selection, image generating unit 711 can continuously display the image, or can temporarily return to the beginning of the moving image and display it.

In the present embodiment, when the selecting device presents guide voice of a selection item and the image corresponding to the selection item, and a user says a word for instructing the selection during the presentation or within a certain time after the completion of the presentation, the user can select the desired selection item. For example, an image itself such as a picture or a movie may be output. In the case of selecting music, advantageously, the music can be easily selected by presenting the image of the jacket of the music.

Exemplary Embodiment 4

The selecting device of each of the above-mentioned embodiments does not have a configuration where time 308B or 309B for selection shown in FIG. 3, for example, is disposed actively. The selecting device according to voice that has an input-waiting-time-length setting unit for setting time 308B or 309B for selection is described with reference to FIG. 10 through FIG. 12.

Disposing the input-waiting-time-length setting unit enables further certain voice recognition.

Figure 10:
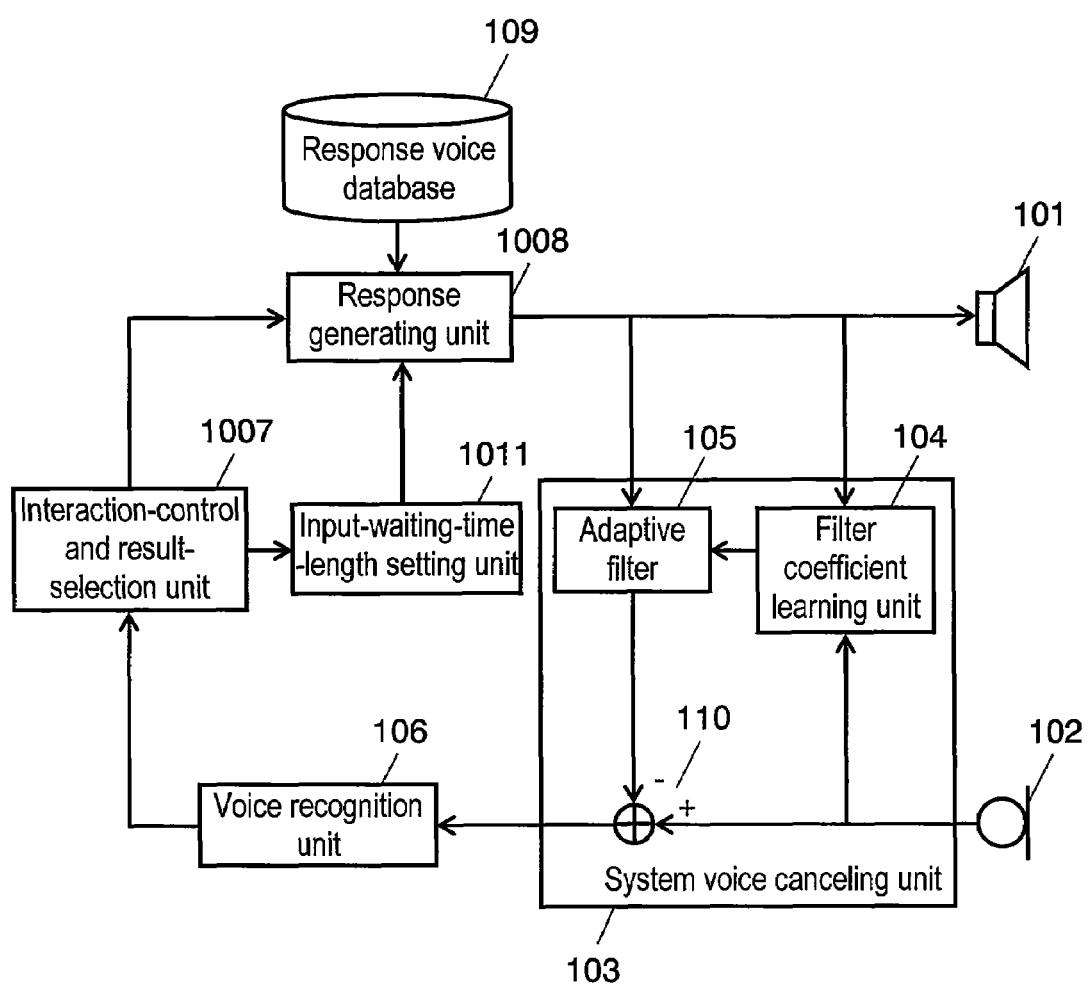
FIG. 10 is a schematic block diagram of a selecting device according to voice in accordance with exemplary embodiment 4 of the present invention.
Figure 11:
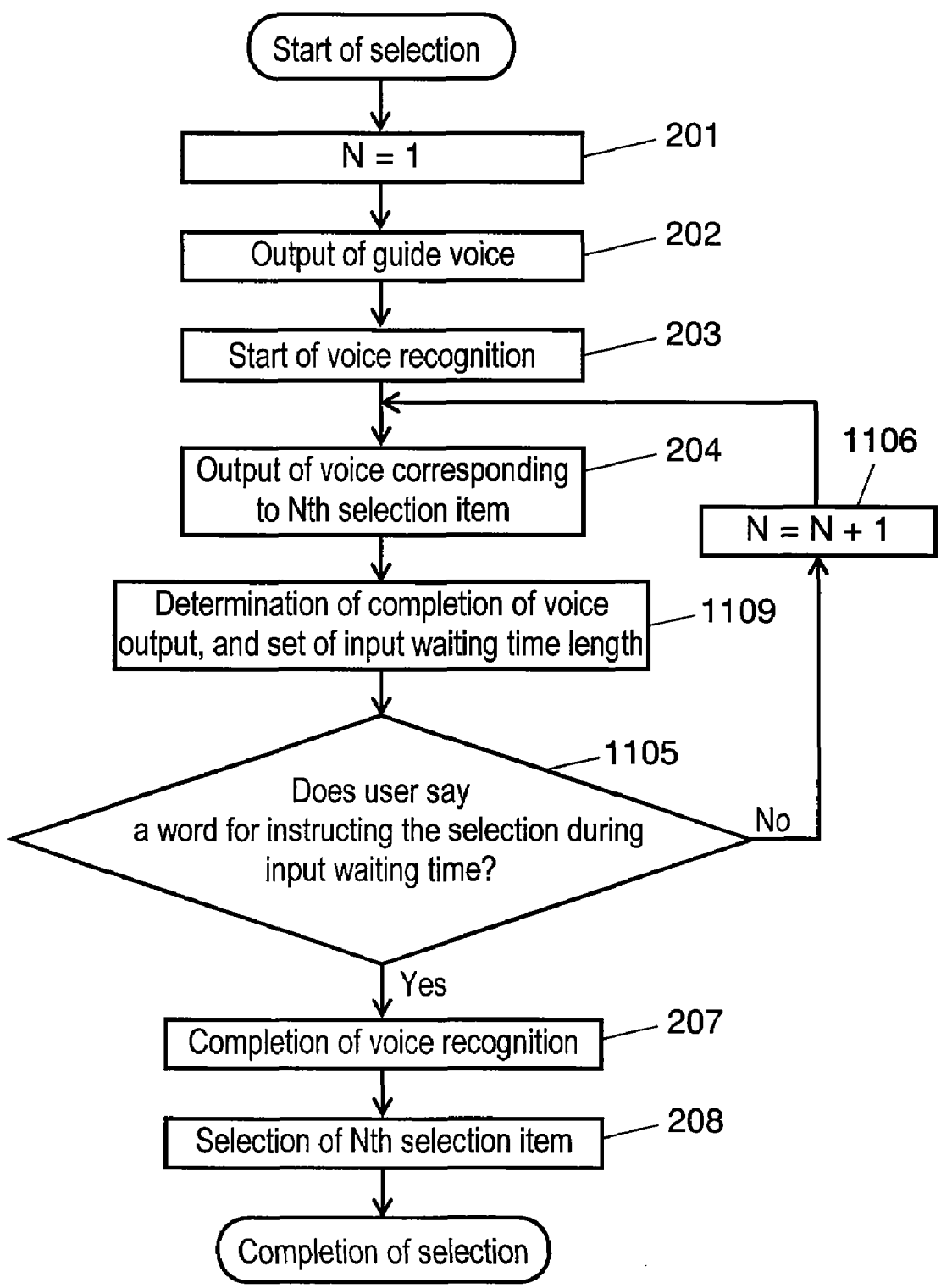
FIG. 11 is a flowchart showing an operation of the selecting device according to voice in accordance with exemplary embodiment 4 of the present invention.
Figure 12:
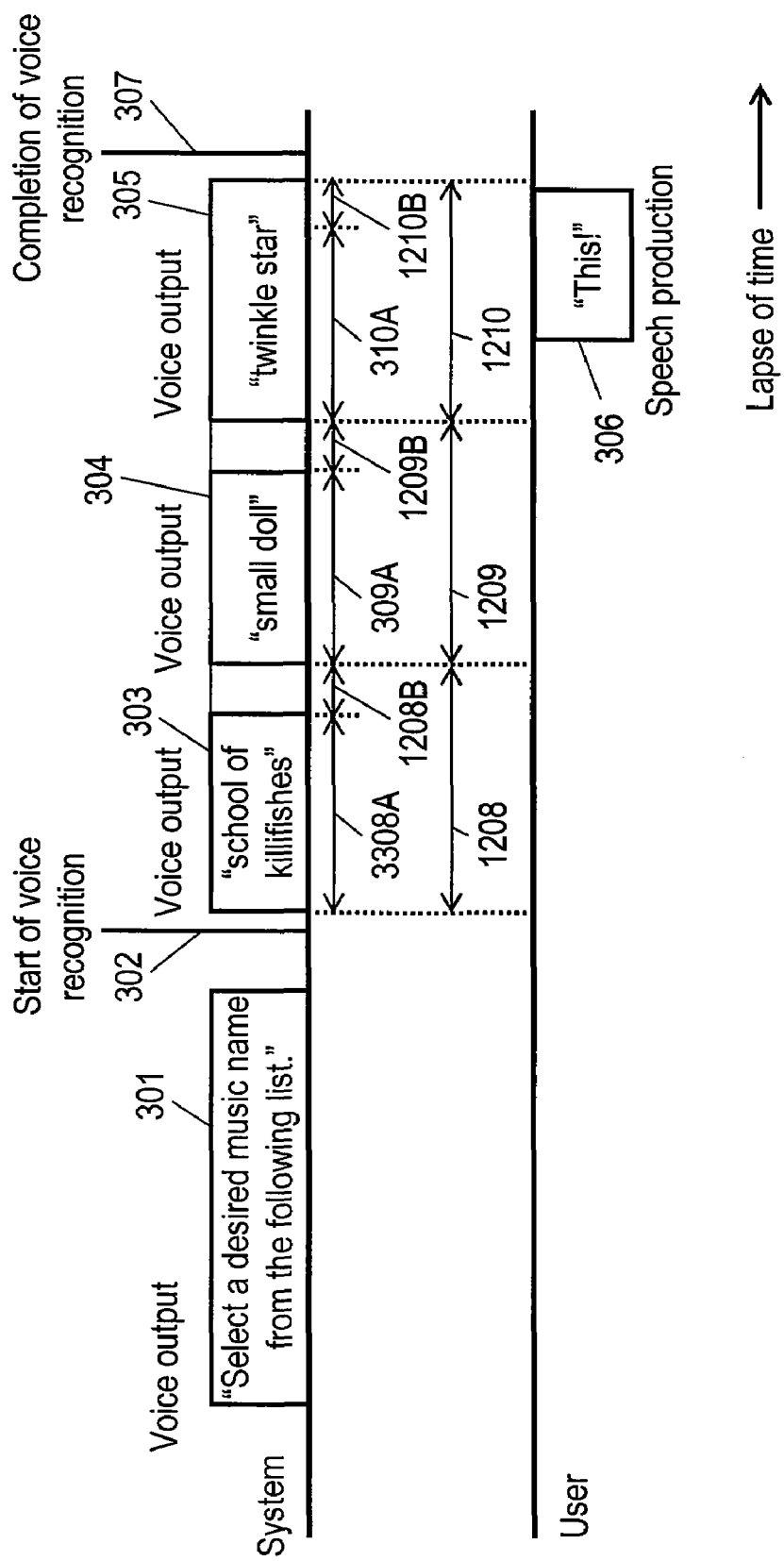
FIG. 12 is a time chart showing the operation of the selecting device according to voice in accordance with exemplary embodiment 4 of the present invention.

FIG. 10 is a schematic block diagram of a selecting device according to voice in accordance with exemplary embodiment 4 of the present invention. FIG. 11 is a flowchart showing an operation of the selecting device. FIG. 12 is a time chart showing the operation of the selecting device.

The fundamental configuration of the present embodiment in FIG. 10 is similar to that of the selecting device according to voice of exemplary embodiment 1, so that only the different points between them are described here and the description of the other configuration and operation is omitted.

Interaction-control and result-selection unit 1007 and response generating unit 1008 have a function different from that in embodiment 1. The selecting device of the present embodiment has input-waiting-time-length setting unit 1011 connected to both of interaction control and result selection unit 1007 and response generating unit 1008.

When voice recognition unit 106 is started under control of interaction-control and result-selection unit 1007, response generating unit 1008 accesses response voice database 109 and outputs the voice data corresponding to a selection item, similarly to embodiment 1.

Interaction control and result selection unit 1007 determines whether or not the output of the voice data corresponding to the selection item is finished.

When the output of the voice data is recognized based on the determination of interaction control and result selection unit 1007, input-waiting-time-length setting unit 1011 for setting a time for user's response sets an input-waiting-time-length.

During the input-waiting-time-length, interaction control and result selection unit 1007 prohibits the operation of response generating unit 1008.

The operation of the selecting device according to voice of the present embodiment is described with reference to FIG. 11 and FIG. 12. The operation (steps 201 through 203) until the start of the voice recognition is similar to that in embodiment 1, and hence is not described.

After the start of voice recognition unit 106 in step 203, response generating unit 1008 accesses response voice database 109 and outputs the voice data corresponding to the first selection item, under control of interaction control and result selection unit 1007 (step 204).

In other words, as shown in FIG. 12, guide voice "school of killifishes" (303) is supplied to speaker 101.

Next, interaction control and result selection unit 1007 determines whether or not the output of guide voice "school of killifishes" (303) is finished.

When the output of guide voice "school of killifishes" (303) is determined to be finished, input-waiting-time-length setting unit 1011 sets input-waiting-time-length 1208B under control of interaction control and result selection unit 1007 (step 1109).

Period 308A when guide voice "school of killifishes" (303) is output and certain time (input-waiting-time-length) 1208B after the completion of the output correspond to period 1208 when "school of killifishes" as the first selection item can be selected. Therefore, when the user says a word for instructing the selection, for example "This!", in period 1208, the user can select "school of killifishes".

Interaction control and result selection unit 1007 prohibits the operation of response generating unit 1008 so that response generating unit 1008 does not output next guide voice or malfunction-caused guide voice during the input-waiting-time-length set by input-waiting-time-length setting unit 1011.

Whether to prohibit the operation of response generating unit 1008 depends on whether or not the time set by input-waiting-time-length setting unit 1011 elapses.

When the user does not say any word for instructing the selection, for example "This!", in period 1208 when "school of killifishes" can be selected, 1 is added to counter N of the selection items to provide the state where the guide voice corresponding to the next selection item is output.

In other words, when the voice corresponding to the selection item is output in step 204, interaction control and result selection unit 1007 determines whether or not the user says a word for instructing the selection during presentation of the selection item or within the certain time, namely the input-waiting-time-length set in step 1109, after the completion of the presentation (step 1105).

When the user says the word for instructing the selection ("Yes" in step 1105) within the input-waiting-time-length, "school of killifishes" is selected, for example. When the user does not say any word for instructing the selection ("No" in step 1105), 1 is added to counter N of the selection items (step 1106) to provide the state where the guide voice corresponding to the next selection item, namely the second selection item, is output (step 204).

At this time, in FIG. 12, period 309A or 310A when guide voice (304 or 305) corresponding to the second or third selection item is output and certain time 1209B or 1210B after the completion of each output correspond to period 1209 or 1210 when the second or third selection item can be selected.

The operation after that is similar to that of embodiment 1 shown in FIG. 2.

The selecting device of the present embodiment has input-waiting-time-length setting unit 1011, and hence can set an active queuing time for waiting a response from the user.

A period when a user can certainly respond can be established by actively setting the queuing time, because the problem that a next guide voice or the like is accidentally output in the input-waiting-time-length and reduces the input-waiting-time-length is prevented.

The configuration having input-waiting-time-length setting unit 1011 of the present embodiment can be applied to the configurations of embodiment 2 and embodiment 3, and an operation and advantage similar to those of the present embodiment can be obtained surely in embodiments 2 and 3.

In the present invention, embodiments may be combined as appropriate. For example, in addition to the guide voice of each selection item, the image and music corresponding to the selection item may be presented for selection. A user can select a desired selection item by saying a word for instructing the selection during the presentation of the selection item or within the input-waiting-time-length of the certain time after the completion of the presentation.

INDUSTRIAL APPLICABILITY

A selecting device according to voice of the present invention includes an output unit for outputting guide voice for guiding a selection item, a voice recognition unit for recognizing a selection instruction for selecting a selection item that is issued during the output of the guide voice by the output unit or within a set input-waiting-time-length of a certain time after the completion of the output, and an interaction-control and result-selection unit for selecting the selection item instructed to be selected when the voice recognition unit recognizes the selection instruction. The selecting device is widely applied to an on-vehicle electronic apparatus such as a car audio set or a car air conditioner, an electronic office machine such as an electronic blackboard or a projector, and a domestic electronic apparatus used for a physically-handicapped person.

The invention claimed is:

1. A selecting device according to voice comprising:
    an output unit for outputting guide voice for guiding a selection item;
    a voice recognition unit for recognizing a selection instruction for selecting the selection item that is issued during output of the guide voice by the output unit or within a certain time after the completion of the output;
    an interaction-control and result-selection unit for selecting the selection item instructed to be selected when the voice recognition unit recognizes the selection instruction; and
    a content playing unit for playing a part or whole of content corresponding to the guide voice when the output unit guides the selection item, and for playing a beginning of the content corresponding to the selected selection item when the interaction-control and result-selection unit selects the selection item corresponding to the selection instruction.

2. The selecting device according to claim 1, wherein the content playing unit plays both of a part or whole of the content corresponding to the guide voice and the guide voice simultaneously when the output unit guides the selection item.

3. A selecting method according to voice comprising;
    outputting guide voice for guiding a selection item by an output unit;
    recognizing a selection instruction for selecting the selection item that is issued during output of the guide voice by the output unit or within a certain time after the completion of the output by a voice recognition unit;
    selecting the selection item instructed to be selected when the voice recognition unit recognizes the selection instruction by an interaction-control and result-selection unit; and
    playing a part or whole of content corresponding to the guide voice when the output unit guides the selection item, and playing a beginning of the content corresponding to the selected selection item when the interaction-control and result-selection unit selects the selection item corresponding to the selection instruction by a content playing unit.

4. The selecting method according to voice of claim 3, wherein the content playing unit plays both of a part or whole of the content corresponding to the guide voice and the guide voice simultaneously when the output unit guides the selection item.

* * * * *